US010718628B2

(12) United States Patent
Shiina et al.

(10) Patent No.: US 10,718,628 B2
(45) Date of Patent: Jul. 21, 2020

(54) HOST VEHICLE POSITION ESTIMATION DEVICE

(71) Applicant: HITACHI AUTOMOTIVE SYSTEMS, LTD., Hitachinaka-shi, Ibaraki (JP)

(72) Inventors: Yuhi Shiina, Ibaraki (JP); Hideaki Kido, Ibaraki (JP); Takeshi Nagasaki, Ibaraki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 348 days.

(21) Appl. No.: 15/520,182

(22) PCT Filed: Nov. 18, 2015

(86) PCT No.: PCT/JP2015/082334
§ 371 (c)(1),
(2) Date: Apr. 19, 2017

(87) PCT Pub. No.: WO2016/093028
PCT Pub. Date: Jun. 16, 2016

(65) Prior Publication Data
US 2017/0314956 A1    Nov. 2, 2017

(30) Foreign Application Priority Data

Dec. 8, 2014   (JP) ................................ 2014-247989

(51) Int. Cl.
*G01C 21/36*   (2006.01)
*G01C 21/30*   (2006.01)
(Continued)

(52) U.S. Cl.
CPC ......... *G01C 21/3679* (2013.01); *G01C 21/30* (2013.01); *G01C 21/36* (2013.01);
(Continued)

(58) Field of Classification Search
CPC ......... G01C 11/00; G01C 11/04; G01C 11/06; G01C 11/08; G01C 11/10; G01C 11/12;
(Continued)

(56) References Cited

U.S. PATENT DOCUMENTS 6,560,529 B1 *  5/2003  Janssen .................... G06K 9/72
                                                    701/469
6,671,615 B1 * 12/2003  Becker ............... G01C 21/3697
                                                    340/988

(Continued)

FOREIGN PATENT DOCUMENTS

JP        63-115300 A       5/1988
JP        63115300 A    *   5/1988   ............. G01C 21/00
(Continued)

OTHER PUBLICATIONS

Extended European Search Report dated Jul. 13, 2018 in the Application No. 15867690.8.
(Continued)

*Primary Examiner* — Thomas G Black
*Assistant Examiner* — Sara J Lewandroski
(74) *Attorney, Agent, or Firm* — Foley & Lardner LLP

(57) ABSTRACT

Provided is a host vehicle position estimation device capable of accurately estimating the position of a host vehicle on a map even if there is no landmark that can be referred to on an image photographed using a camera. A host vehicle position is estimated on the basis of intermediate information about a landmark name and landmark distance for an intermediate object extracted from a photographed image of the surroundings of a host vehicle, distance information about the distance to the intermediate object, and landmark information stored beforehand about the landmark name and position.

10 Claims, 10 Drawing Sheets

(51) Int. Cl.
*G06T 7/593* (2017.01)
*G01C 21/26* (2006.01)

(52) U.S. Cl.
CPC ...... *G01C 21/3644* (2013.01); *G01C 21/3682* (2013.01); *G06T 7/593* (2017.01); *G01C 21/26* (2013.01); *G06T 2207/10021* (2013.01); *G06T 2207/20076* (2013.01); *G06T 2207/30244* (2013.01); *G06T 2207/30252* (2013.01)

(58) Field of Classification Search
CPC ......... G01C 11/28; G01C 11/30; G01C 11/32; G01C 21/26; G01C 21/265; G01C 21/28; G01C 21/30; G01C 21/32; G01C 21/34; G01C 21/3407; G01C 21/3476; G01C 21/3602; G01C 21/3644; G01C 21/3679; G01C 21/3682; G06T 7/50; G06T 7/507; G06T 7/514; G06T 7/521; G06T 7/529; G06T 7/536; G06T 7/543; G06T 7/55; G06T 7/557; G06T 7/564; G06T 7/571; G06T 7/579; G06T 7/586; G06T 7/593; G06T 7/596; G06T 2207/10004; G06T 2207/10012; G06T 2207/10016; G06T 2207/10021; G06T 2207/10028; G06T 2207/30252; G06T 2207/30261; G01S 11/02; G01S 11/12
See application file for complete search history.

(56) References Cited

U.S. PATENT DOCUMENTS

| | | | | |
|---|---|---|---|---|
| 2008/0243378 A1* | 10/2008 | Zavoli | ............... | G01C 21/28 701/533 |
| 2009/0115638 A1* | 5/2009 | Shankwitz | ............. | G01C 21/26 340/988 |
| 2012/0271540 A1* | 10/2012 | Miksa | ................... | G01S 13/865 701/409 |
| 2013/0103304 A1* | 4/2013 | Nishibashi | ......... | G01C 21/3655 701/410 |
| 2013/0124083 A1* | 5/2013 | Kratzsch | ............. | G01C 21/3602 701/410 |
| 2014/0168377 A1* | 6/2014 | Cluff | .................... | H04N 13/246 348/47 |
| 2014/0236472 A1* | 8/2014 | Rosario | .............. | G01C 21/3602 701/400 |
| 2015/0345974 A1* | 12/2015 | Takahashi | .......... | G06K 9/00818 701/461 |
| 2016/0140718 A1* | 5/2016 | Ishida | .................. | H04N 13/239 345/419 |
| 2016/0231135 A1* | 8/2016 | Nishibashi | ......... | G01C 21/3629 |
| 2018/0365502 A1* | 12/2018 | Stein | ......................... | G06T 7/74 |

FOREIGN PATENT DOCUMENTS

| | | | | |
|---|---|---|---|---|
| JP | H10300493 A | * | 11/1998 | ............ B60W 30/00 |
| JP | 2000-097714 A | | 4/2000 | |
| JP | 2009-020014 A | | 1/2009 | |
| JP | 2010-190647 A | | 9/2010 | |
| JP | 2012-185011 A | | 9/2012 | |
| JP | 2014-134469 A | | 7/2014 | |
| JP | 2014134469 A | * | 7/2014 | |

OTHER PUBLICATIONS

Japanese Office Action and its English translation thereof issued in corresponding application No. 2016-563586 dated Jun. 26, 2018.
International Search Report dated Feb. 9, 2016 as received in corresponding International Application No. PCT/JP2015/082334.
Written Opinion of the International Search Authority dated Feb. 9, 2016 as received in corresponding International Application No. PCT/JP2015/082334.

* cited by examiner

HOST VEHICLE POSITION ESTIMATION DEVICE

TECHNICAL FIELD

The present invention relates to a host vehicle position estimation device, and more particularly, to a host vehicle position estimation device that estimates a host vehicle position on a map in a global positioning system (GPS), for example, using images of surroundings of a host vehicle which are photographed using a camera.

BACKGROUND ART

In the conventional art, a car navigation system, an automatic driving system, and the like are widely known as a system using a host vehicle position on a map. A global positioning system (GPS) is known as technology which is used for the systems.

In the convention system, since a host vehicle position on a map has an error of about several meters, for example, there is a problem in that an intersection in which the vehicle has to make a turn is mistaken or a vehicle travels on a lane which does not guide the vehicle to a destination.

In order to solve such a problem, various techniques for estimating a host vehicle position on a map with higher accuracy have been studied. For example, PTL 1 discloses a technique of recognizing a landmark (a landmark which is a sign having a predetermined feature) present on a map from images photographed using a camera and estimating a host vehicle position on the map.

A self-position estimating device disclosed in PTL 1 includes landmark detecting means that detects a landmark, reliability acquiring means that acquires landmark reliability which is reliability of the landmark detected by the landmark detecting means, and self-position estimating means that estimates a self-position on the basis of a plurality of landmarks detected by the landmark detecting means, and the self-position estimating means sequentially selects the landmarks to be used to estimate the self-position from the landmark having highest landmark reliability.

According to the self-position estimating device disclosed in PTL 1, when a plurality of landmarks are extracted, it is possible to accurately recognize different landmarks and to estimate a self-position with high accuracy.

CITATION LIST

Patent Literature

PTL 1: Japanese Patent Application Laid-open No. 2009-20014

SUMMARY OF INVENTION

Technical Problem

However, in the conventional technique disclosed in PTL 1, when no referable landmark is present in an image photographed using a camera, there is a problem in that a host vehicle position is not estimated and stability of the device is not satisfactory.

The invention is made in consideration of the above-mentioned problem and an object thereof is to provide a host vehicle position estimation device that can accurately estimate a host vehicle position on a map even when no referable landmark is present in an image photographed using a camera.

Solution to Problem

In order to solve the above issue, a host vehicle position estimation device according to the present invention estimates a position of a host vehicle using landmark information on names and positions of landmarks which is stored in advance, and includes: an image acquiring unit configured to acquire an image by photographing surroundings of the host vehicle; a distance information acquiring unit configured to acquire distance information on a distance in a traveling direction of the host vehicle to an object appearing in the image or a straight-line distance to the object; an intermediate object extracting unit configured to extract an intermediate object having intermediate information on a name of a landmark and a distance to the landmark from the image and to acquire distance information on a distance to the intermediate object on the basis of the image and the distance information acquired by the distance information acquiring unit; and a host vehicle position estimating unit configured to estimate the host vehicle position on the basis of the intermediate information of the intermediate object and the distance information on the distance to the intermediate object which are extracted by the intermediate object extracting unit and the landmark information.

Advantageous Effects of Invention

According to the invention, by estimating a host vehicle position on the basis of the intermediate information on a name of a landmark as an intermediate object extracted from an image acquired by photographing the surroundings of the host vehicle and a distance to the landmark, the distance information on a distance to the intermediate object, and the landmark information on names and positions of landmarks which is stored in advance, it is possible to accurately estimate a host vehicle position on a map, for example, even when no referable landmark is present in an image photographed using a camera.

Objects, configurations, and advantageous effects other than described above will be apparent from following description of embodiments.

DESCRIPTION OF EMBODIMENTS

Hereinafter, embodiments of a host vehicle position estimation device according to the invention will be described with reference to the accompanying drawings.

First Embodiment

Figure 1:
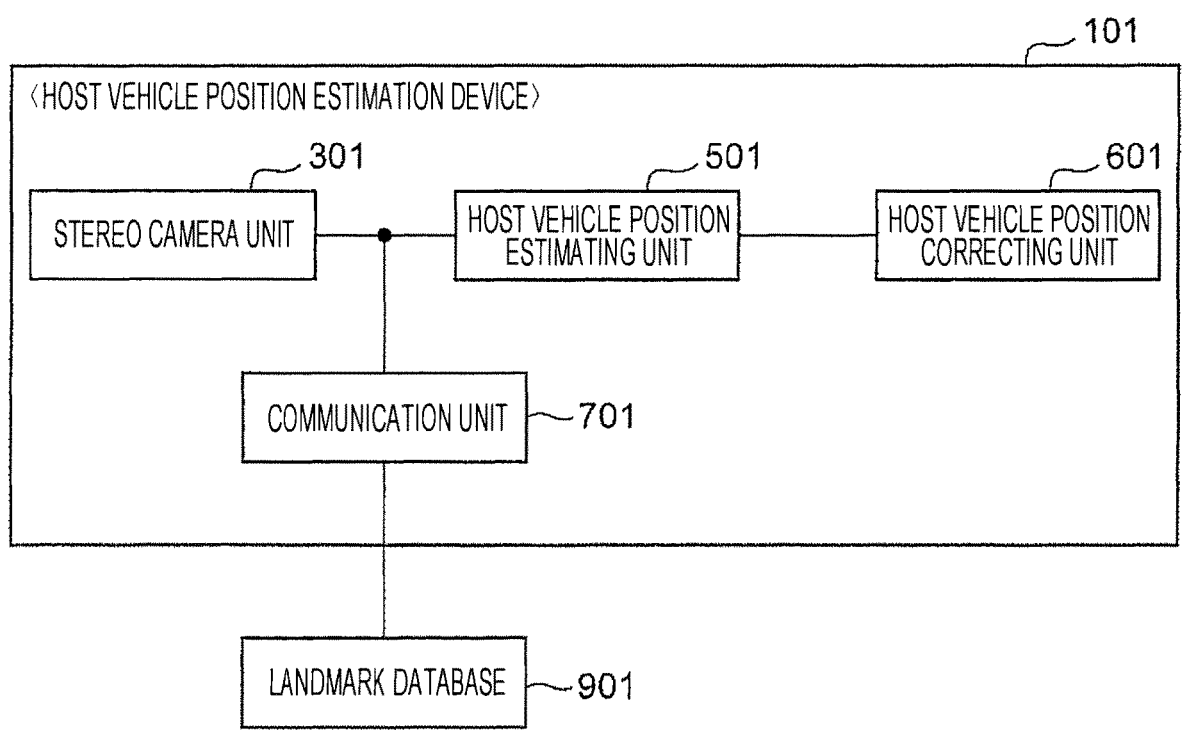
FIG. 1 is a block diagram illustrating an internal configuration of a first embodiment of a host vehicle position estimation device according to the invention.

FIG. 1 is a block diagram illustrating an internal configuration of a first embodiment of a host vehicle position estimation device according to the invention.

A host vehicle position estimation device 101 illustrated in the drawing is mounted on a vehicle such as an automobile and mainly includes a stereo camera unit 301, a host vehicle position estimating unit 501, a host vehicle position correcting unit 601, and a communication unit 701. The units are connected to each other in an accessible manner. A landmark database 901 as a storage unit in which information on types (names) of landmarks and positions thereof on a map (landmark information) is stored in advance is disposed outside the host vehicle position estimation device 101, and the host vehicle position estimation device 101 is connected to the landmark database 901 via the communication unit 701 in an accessible manner.

The stereo camera unit 301 constituting the host vehicle position estimation device 101 is provided with a plurality of (two in this embodiment) cameras 303 and 305, and the stereo camera unit 301 performs processes of preparing or recognizing a distance image using images acquired by the cameras 303 and 305 and outputs the results to the communication unit 701 and the host vehicle position estimating unit 501. A communication standard such as a controller area network (CAN) can be applied to connection of the stereo camera unit 301 to other units.

The communication unit 701 serves to exchange data with the landmark database 901, receives data stored in the landmark database 901, and transmits the received data to the host vehicle position estimating unit 501.

The host vehicle position estimating unit 501 estimates a position of the host vehicle on a map using the results acquired from the stereo camera unit 301 and the data acquired from the landmark database 901 via the communication unit 701, and outputs the estimation result to the host vehicle position correcting unit 601.

The host vehicle position correcting unit 601 corrects the host vehicle position on a map acquired by a global positioning system (GPS) using the estimation result transmitted from the host vehicle position estimating unit 501.

Figure 2:
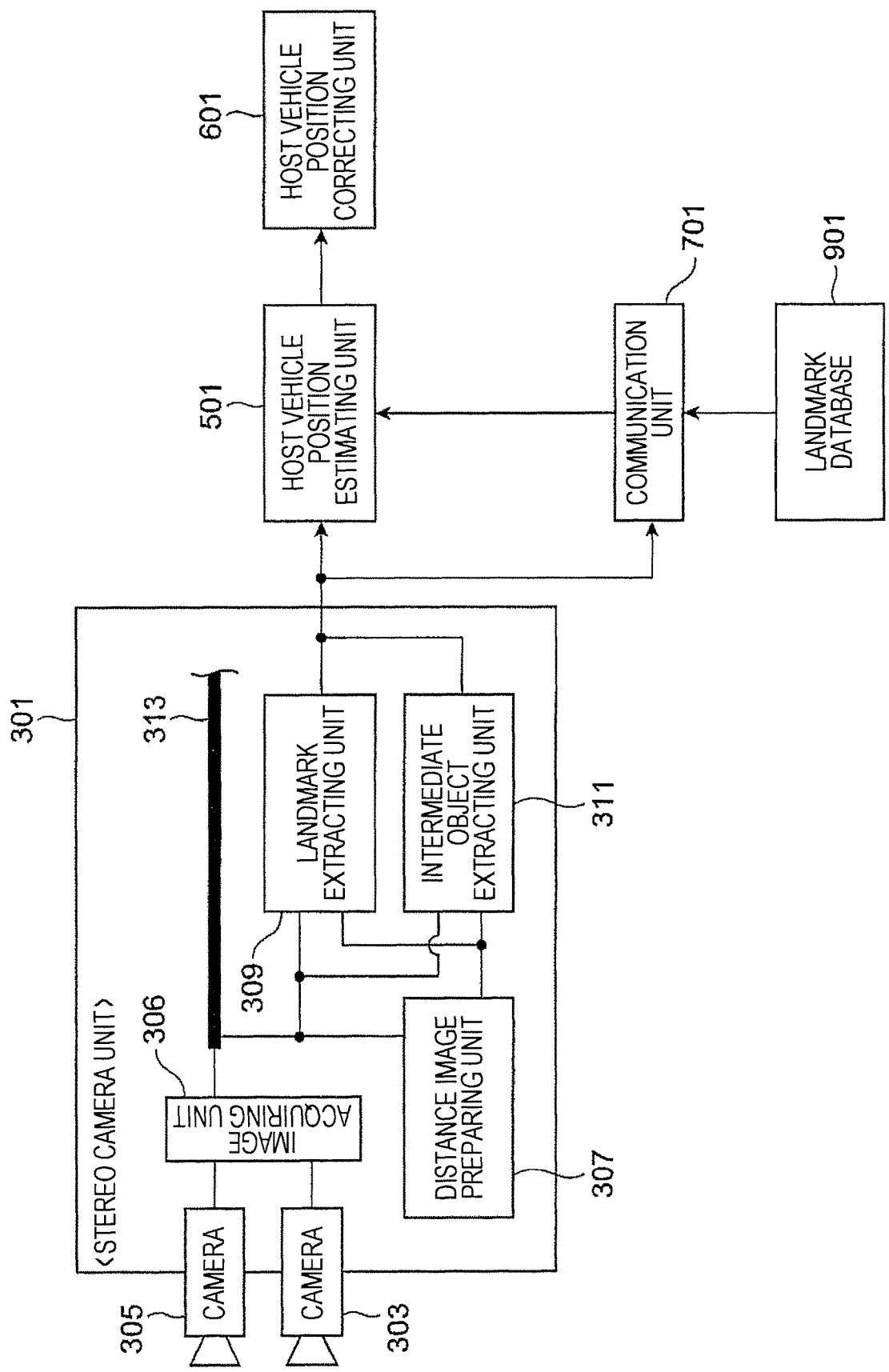
FIG. 2 is a block diagram illustrating an internal configuration of a stereo camera unit illustrated in FIG. 1.

FIG. 2 illustrates an internal configuration of the stereo camera unit 301 illustrated in FIG. 1.

The stereo camera unit 301 serves to recognize an environment around the host vehicle on the basis of image information of an imaging target area on the front side of the vehicle provided with the host vehicle position estimation device 101 and, as illustrated in FIG. 2, mainly includes a pair of cameras 303 and 305 arranged in a vehicle width direction (a lateral direction) of the host vehicle to face the front side of the vehicle, an image acquiring unit 306, a distance image preparing unit (distance information acquiring unit) 307, a landmark extracting unit 309, an intermediate object extracting unit 311, and a bus 313 capable of accessing images acquired by the two cameras 303 and 305.

The image acquiring unit 306 of the stereo camera unit 301 acquires images which are synchronously photographed using two cameras 303 and 305 periodically or at an arbitrary timing, and the distance image preparing unit 307 prepares an image (a distance image) having depth information (distance information) using the images (synchronous images) acquired by the image acquiring unit 306. The method of preparing the distance image is known well and thus detailed description thereof will not be made herein.

The landmark extracting unit 309 extracts a landmark from the images using the image acquired by the distance image preparing unit 307 and the images acquired by the two cameras 303 and 305, and outputs information on the extracted landmark to the host vehicle position estimating unit 501 and the communication unit 701. Here, a landmark in the invention means, for example, an object which can serve as a sign having a predetermined feature among objects installed on a road and examples thereof include a signboard, a speed sign, a signal, and a building. As the method of extracting a landmark, template matching or the like can be used.

Figure 3:
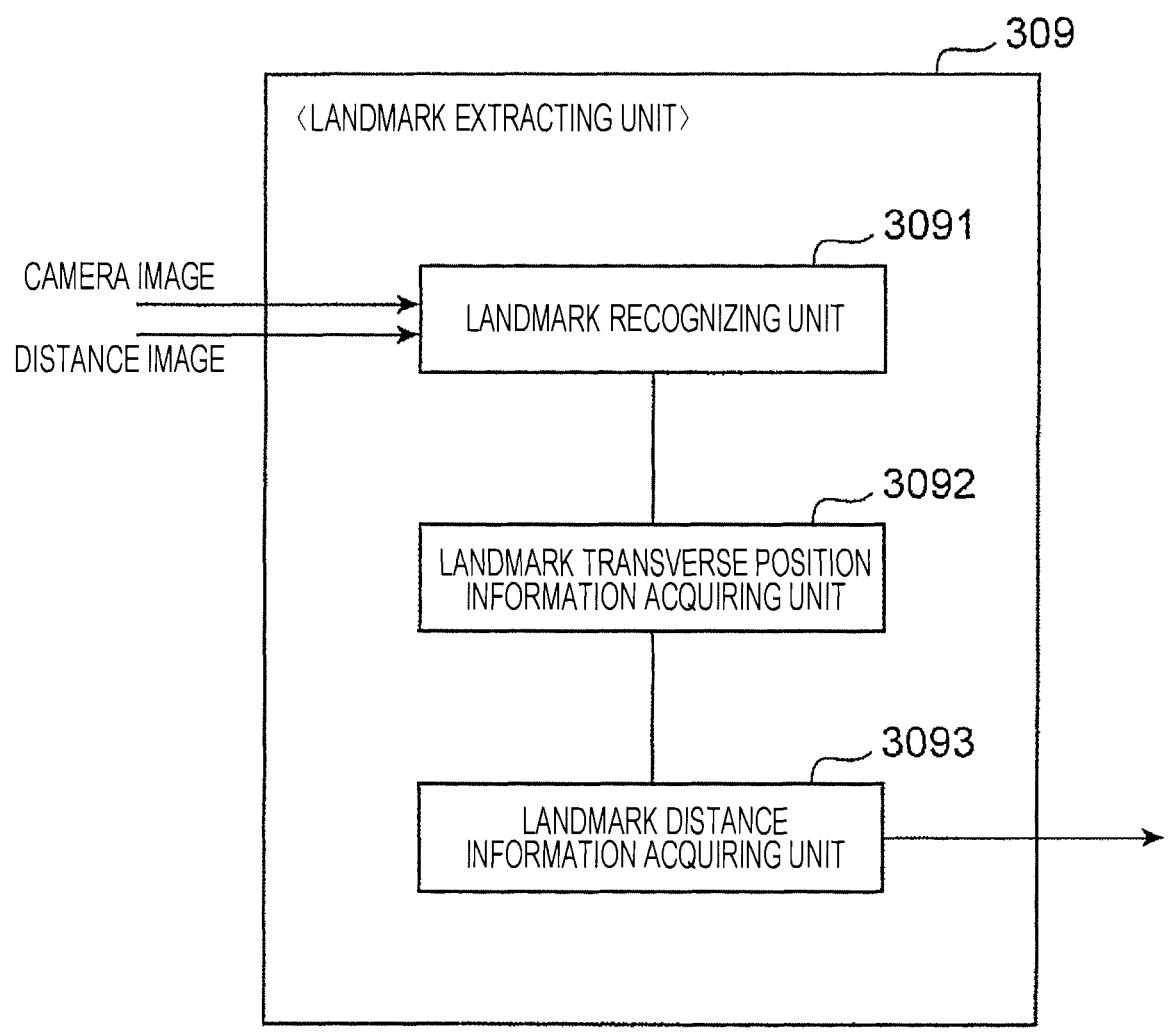
FIG. 3 is a block diagram illustrating an internal configuration of a landmark extracting unit illustrated in FIG. 2.

Specifically, as illustrated in FIG. 3, the landmark extracting unit 309 includes a landmark recognizing unit 3091, a landmark transverse position information acquiring unit 3092, and a landmark distance information acquiring unit 3093.

The landmark recognizing unit 3091 extracts the above-mentioned landmark from the images and specifies a type (name) of an object which is acquired as the landmark. The landmark transverse position information acquiring unit 3092 acquires a transverse position of the extracted landmark with respect to the host vehicle. Here, a transverse position means a length of a perpendicular line (that is, a distance in a transverse direction perpendicular to the traveling direction of the host vehicle) when a perpendicular line is drawn from the position of the extracted landmark to a straight line extending in the traveling direction of the host vehicle (an photographing direction) from the substantial center of the host vehicle (for example, see L1 and L2 in FIG. 7 or L3 in FIG. 9). In general, a resolution of the transverse position is considered to be more excellent in a stereo camera including a plurality of cameras than in radar and a more accurate transverse position can be acquired using the stereo camera as in this embodiment. The landmark distance information acquiring unit 3093 acquires a straight-line distance from the host vehicle to the landmark using the transverse position acquired by the landmark transverse position information acquiring unit 3092 and the image acquired by the distance image preparing unit 307 (for example, see D1 and D2 in FIG. 7 or D3 in FIG. 9).

The landmark extracting unit 309 outputs information on the landmark acquired by the landmark recognizing unit 3091, the landmark transverse position information acquiring unit 3092, or the landmark distance information acquiring unit 3093 to the host vehicle position estimating unit 501 and the communication unit 701.

Similarly to the landmark extracting unit 309, the intermediate object extracting unit 311 extracts an intermediate object from the images and outputs information on the extracted intermediate object to the host vehicle position estimating unit 501 and the communication unit 701. Here, an intermediate object in the invention means an object having information (intermediate information) on the name of the landmark among objects around the host vehicle and a distance to the landmark, and examples thereof include a guide sign of a tollgate of an expressway, a guide display board to a restaurant or a theme park, and an exit, a diverging point, or a junction of an expressway.

Figure 4:
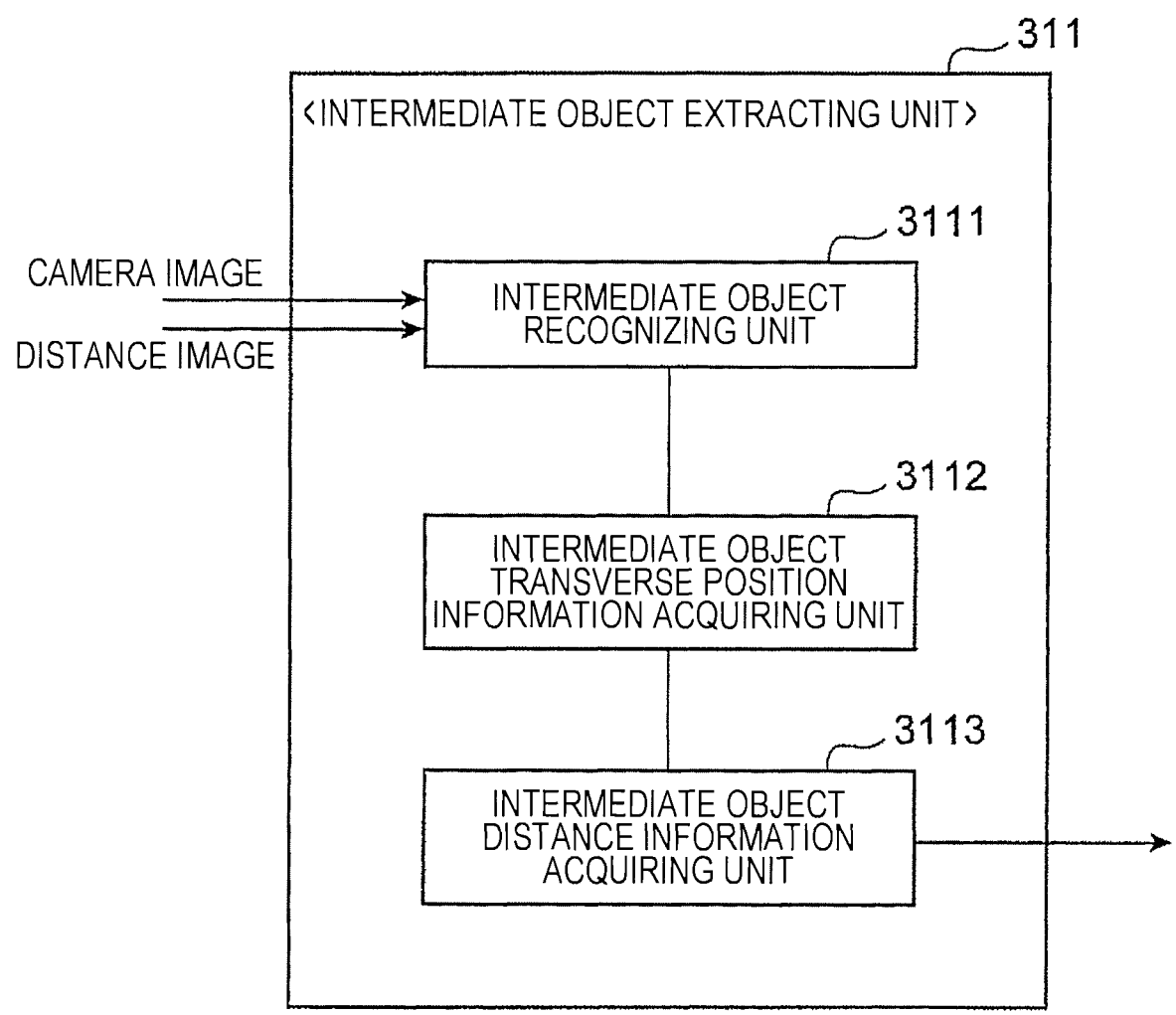
FIG. 4 is a block diagram illustrating an internal configuration of an intermediate object extracting unit illustrated in FIG. 2.

Specifically, as illustrated in FIG. 4, the intermediate object extracting unit 311 includes an intermediate object recognizing unit 3111, an intermediate object transverse position information acquiring unit 3112, and an intermediate object distance information acquiring unit 3113.

The intermediate object recognizing unit 3111 extracts the above-mentioned intermediate object from the images and recognizes a name of a landmark included in the intermediate object and a distance to the landmark (for example, as character information). The intermediate object transverse position information acquiring unit 3112 acquires a transverse position of the extracted intermediate object with respect to the host vehicle (for example, see L4 in FIG. 9), and the intermediate object distance information acquiring unit 3113 acquires a straight-line distance from the host vehicle to the intermediate object using the transverse position acquired by the intermediate object transverse position information acquiring unit 3112 and the image acquired by the distance image preparing unit 307 (for example, see D4 in FIG. 9).

The intermediate object extracting unit 311 outputs information on the intermediate object acquired by the intermediate object recognizing unit 3111, the intermediate object transverse position information acquiring unit 3112, or the intermediate object distance information acquiring unit 3113 to the host vehicle position estimating unit 501 and the communication unit 701.

As illustrated in FIG. 2, the communication unit 701 compares the information on the landmark (particularly, a type of an object acquired as the landmark) transmitted from the landmark extracting unit 309, information on the intermediate object (particularly, a name of a landmark included in the intermediate object) transmitted from the intermediate object extracting unit 311, and information (particularly, a name of the landmark) acquired from the landmark database 901, acquires the position of the landmark on a map or the position of the landmark indicated by the intermediate information of the intermediate object (specifically, the landmark having a name coinciding with the name of the landmark included in the intermediate information) on the map, and transmits the acquired position to the host vehicle position estimating unit 501.

The host vehicle position estimating unit 501 estimates the position of the host vehicle on the map on the basis of the position of the landmark on the map acquired via the communication unit 701 and the information on the distance of the landmark acquired from (the landmark extracting unit 309 of) the stereo camera unit 301, or estimates the host vehicle position on the map on the basis of the position of the landmark on the map indicated by the intermediate information of the intermediate object acquired via the communication unit 701 and the information on the distance of the intermediate object acquired from (the intermediate object extracting unit 311 of) the stereo camera unit 301.

Figure 5:
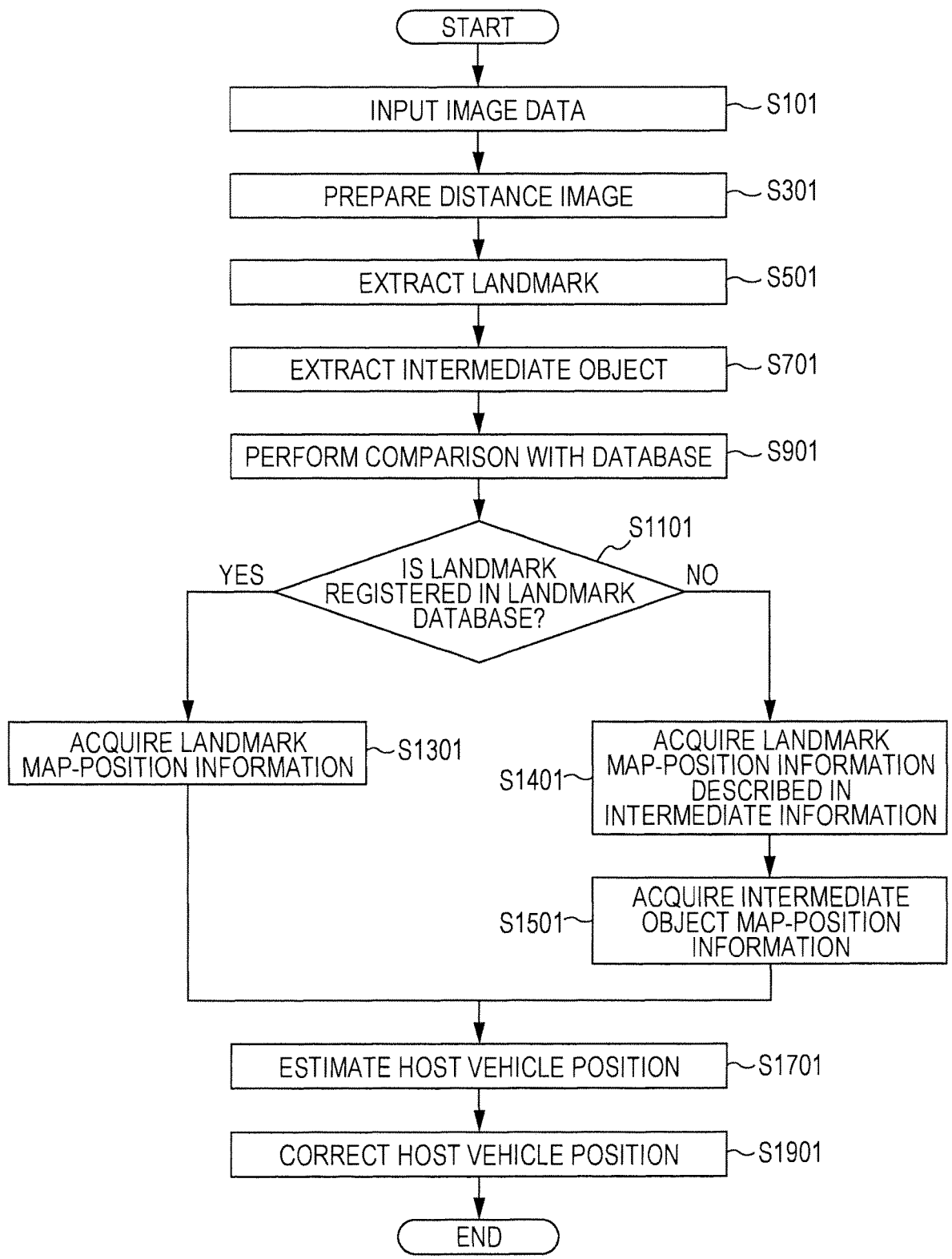
FIG. 5 is a flowchart illustrating a process flow which is performed by the host vehicle position estimation device illustrated in FIG. 1.

FIG. 5 illustrates a process flow which is performed by the host vehicle position estimation device 101 illustrated in FIG. 1. The gist of the invention is to acquire a transverse position of the host vehicle and measure a distance (a straight-line distance) on the basis of the information acquired from the cameras 303 and 305 (the stereo camera) in a landmark extracting process which is performed by the landmark extracting unit 309 (S501) and an intermediate object extracting process which is performed by the intermediate object extracting unit 311 (S701) and to measure a distance (straight-line distance), to cause the communication unit 701 to perform a database comparing process (S901) and then to perform a landmark map-position information acquiring process (S1301) and to perform a host vehicle position estimating process (S1701) when the extracted landmark is registered in the landmark database 901, and to perform the host vehicle position estimating process (S1701) using the position information of the intermediate object acquired in an intermediate object map-position information acquiring process (S1501) when the extracted landmark is not registered in the landmark database 901.

Specifically, as illustrated in FIG. 5, the images acquired by the two cameras 303 and 305 are input (S101) and a distance image is prepared using the two images as an input (S301).

Figure 6:
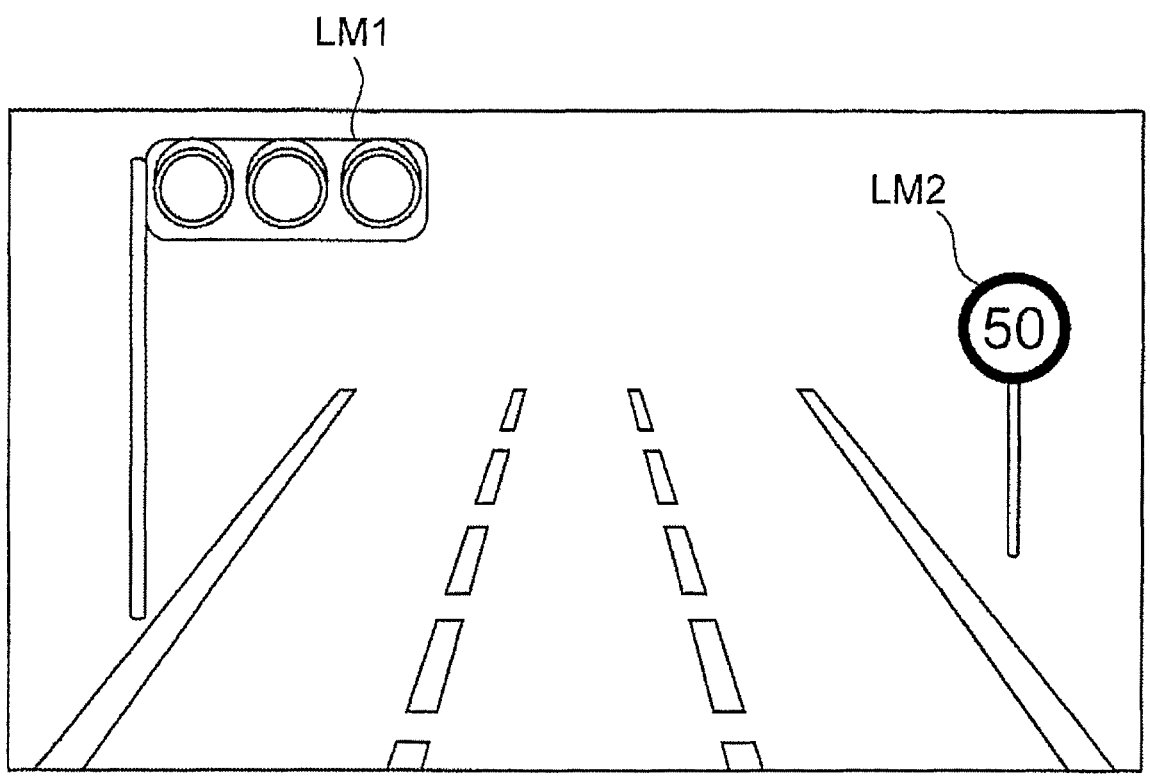
FIG. 6 is a diagram illustrating an example of an image photographed using a camera illustrated in FIG. 2.

Then, a landmark is extracted from the images acquired in S101 and S301 (S501). FIG. 6 illustrates an example of a landmark in one image of the images acquired by the two cameras 303 and 305. Since an object and the like installed on a road is extracted as a landmark, a traffic signal LM1 and a speed sign LM2 are extracted as a landmark in the example illustrated in FIG. 6.

Figure 8:
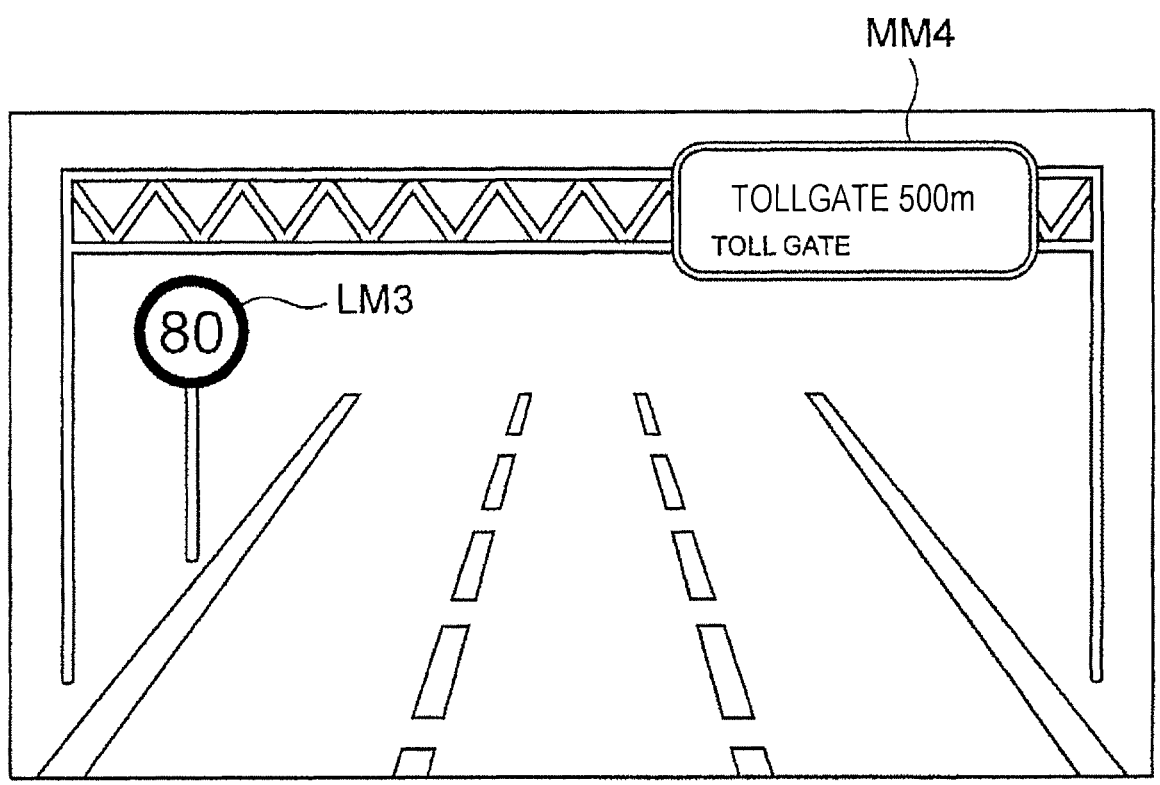
FIG. 8 is a diagram illustrating another example of an image photographed using a camera illustrated in FIG. 2.

Similarly to S501, an intermediate object is extracted from the images acquired in S101 and S301 (S701). FIG. 8 illustrates an example of a landmark and an intermediate object in one image of the images acquired by the two cameras 303 and 305. FIG. 8 includes a speed sign LM3 as a landmark and a tollgate guide sign MM4 as an intermediate object in which a tollgate as a landmark name and 500 m as a distance to the tollgate are drawn. Accordingly, in the example illustrated in FIG. 8, the tollgate guide sign MM4 is extracted and the tollgate as the landmark name and 500 m as the distance to the tollgate are acquired as character information in S701.

S501 and S701 may be performed in a reversed order in the order illustrated in FIG. 5, or may be performed at the same time (that is, in the same extraction process).

Subsequently, the landmark acquired in S501 is compared with the database (S901), and it is checked whether the landmark is registered in the landmark database 901 (S1101).

When the landmark is registered in the landmark database 901, the position of the landmark on a map is acquired from the landmark database 901 (S1301), and the position of the host vehicle V on the map is estimated (S1701).

Figure 7:
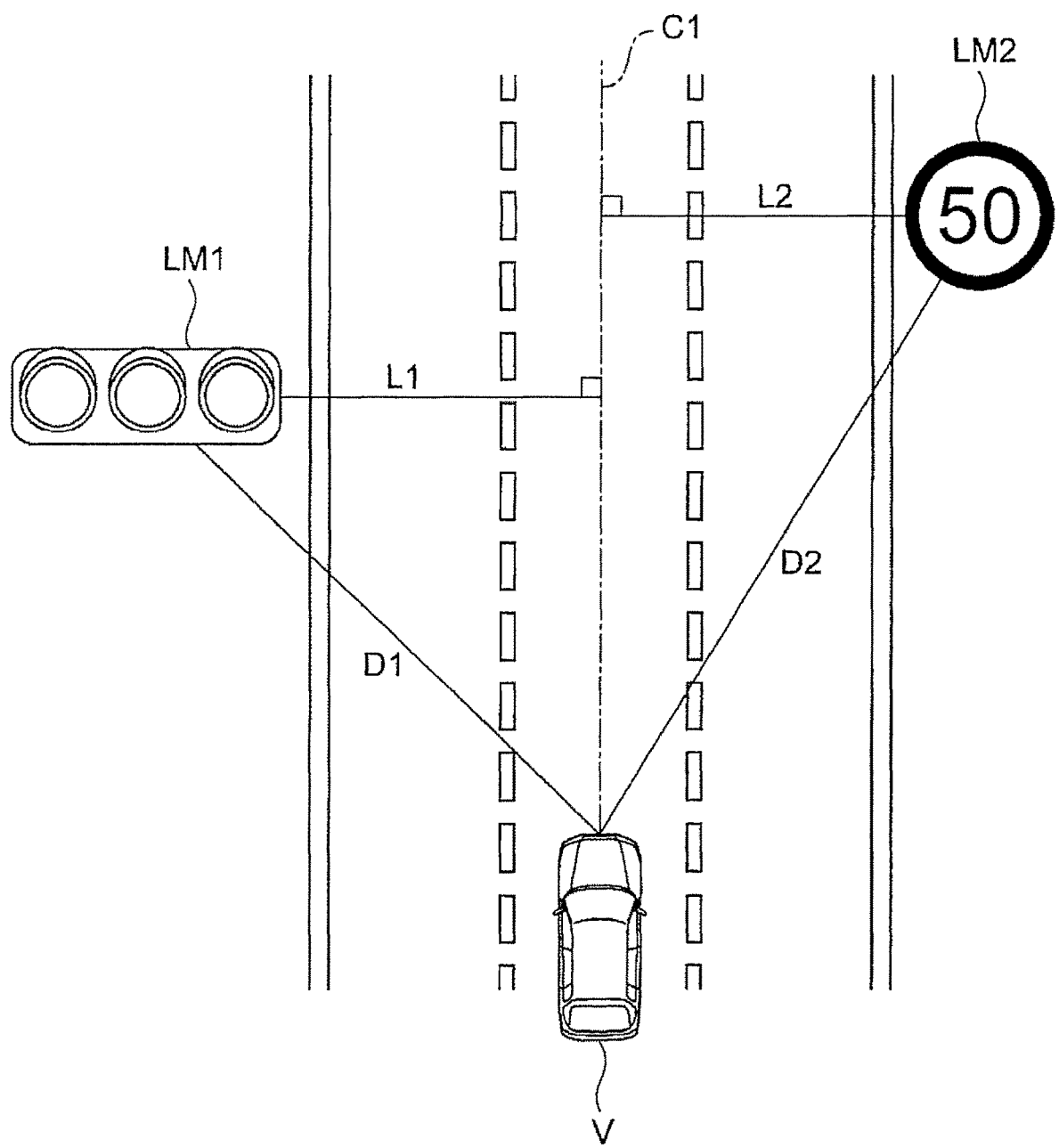
FIG. 7 is a diagram illustrating a positional relationship between a landmark and a host vehicle in the image illustrated in FIG. 6 when viewed from an upside.

FIG. 7 illustrates a positional relationship between the landmarks in the image illustrated in FIG. 6 and the host vehicle when viewed from the upside. In FIG. 7, lengths L1 and L2 of perpendicular lines drawn from the traffic signal LM1 and the speed sign LM2 to a dotted line C1 drawn in the traveling direction from the substantial center of the host vehicle V indicate transverse positions of the landmarks with respect to the host vehicle which are acquired on the basis of the information acquired from the cameras 303 and 305 (the stereo camera), and lengths D1 and D2 of straight lines drawn from the host vehicle V to the landmarks indicate distances between the host vehicle V and the landmarks. Since the resolution of the transverse position of the stereo camera is higher than that of the radar as described above, the distances acquired using the transverse positions can be obtained more accurately by using the stereo camera. Since the positions of the traffic signal LM1 and the speed sign LM2 on the map are acquired from the landmark database 901, the position of the host vehicle V on the map can be estimated using the positions of the landmarks on the map, the transverse positions with respect to the host vehicle V, and the distances.

In the examples illustrated in FIGS. 6 and 7, two landmarks appear, but the host vehicle position can be estimated using only one landmark. Here, when a plurality of landmarks are recognized as illustrated in FIG. 7, probabilities (scores) of types of the landmarks may be used to recognize the landmarks and the landmark having the greatest score may be used to estimate the host vehicle position. Alternatively, a plurality of estimated positions may be output using the plurality of landmarks and an average position thereof may be determined to be the final estimated position, or the final estimated position may be determined by performing weighting based on the scores.

On the other hand, when it is determined as the database comparison (S901) that the landmark acquired in S501 is not registered in the landmark database 901, the position of the landmark described in the intermediate information of the intermediate object acquired in S701 on the map is acquired (S1401), the position of the intermediate object on the map is acquired (specified) using the acquisition result (S1501), and the position of the host vehicle V on the map is estimated (S1701).

Figure 9:
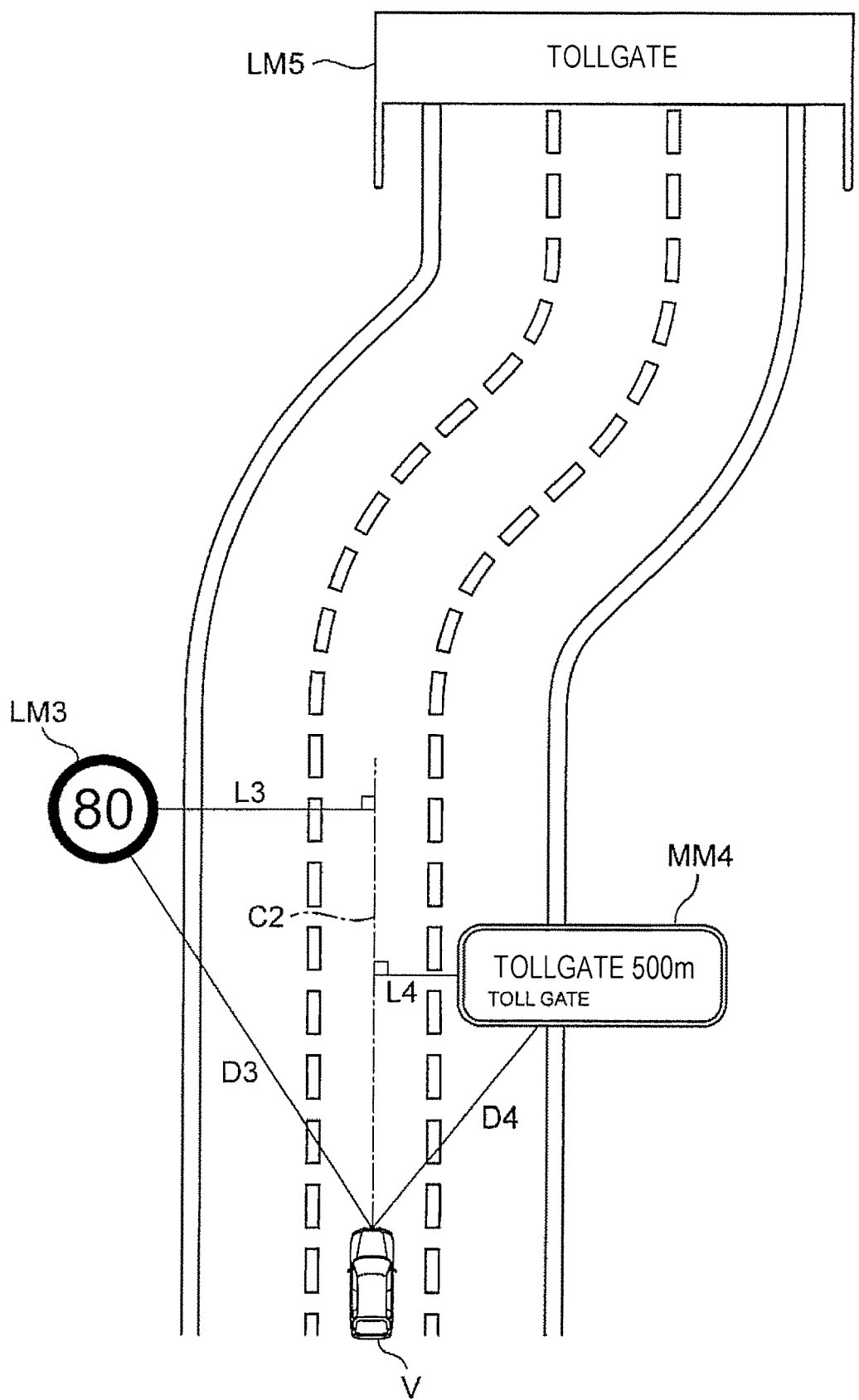
FIG. 9 is a diagram illustrating a positional relationship between an intermediate object and a host vehicle in the image illustrated in FIG. 8 when viewed from an upside.

FIG. 9 illustrates a positional relationship between an intermediate object and the host vehicle in the image illustrated in FIG. 8 when viewed from the upside, and specifically illustrates a positional relationship between a tollgate LM5, a speed sign LM3, a tollgate guide sign MM4, and the host vehicle V when viewed from the upside. The tollgate LM5 does not appear in the images photographed using the cameras 303 and 305. In the example illustrated in FIG. 9, the speed sign LM3 is extracted as a landmark in the landmark extracting process (S501) and the tollgate guide sign MM4 is extracted as an intermediate object in the intermediate object extracting process (S701), but when it is determined as the landmark comparison result that the speed sign LM3 is not registered in the landmark database 901, the host vehicle position on the map is estimated using the tollgate guide sign MM4. More specifically, since information (the intermediate information) on the landmark name (the tollgate) and the distance (500 m) thereto in the intermediate object extracting process (S701) is acquired from the tollgate guide sign MM4, the position of the tollgate LM5 described in the tollgate guide sign MM4 on the map is acquired from the landmark database 901 (S1401) and the position of the tollgate guide sign MM4 on the map is estimated from the position of the tollgate LM5 on the map and the distance (500 m) to the tollgate described in the tollgate guide sign MM4 (S1501). Subsequently, the position of the host vehicle V on the map is estimated from the acquired position of the tollgate guide sign MM4 on the map and a distance D4 of the transverse position L4 of the tollgate guide sign MM4 with respect to the host vehicle V which is acquired using the cameras 303 and 305 (the stereo camera) (S1701).

When the host vehicle position is acquired by a GPS or the like, the host vehicle position on the map acquired by the GPS or the like is corrected using the estimated position acquired in S1701 (S1901).

In this way, the host vehicle position estimation device 101 according to the first embodiment can accurately estimate a host vehicle position on a map, for example, even when a referable landmark is not present in an image photographed using a camera, by estimating the host vehicle position on the basis of the intermediate information on a name of a landmark of an intermediate object and a distance to the landmark which is extracted from an image acquired by photographing surroundings of the vehicle, distance information on a distance (a transverse position and a straight-line distance) to the intermediate object, and landmark information on a name and a position of the landmark stored in advance in the landmark database 901.

Since more accurate position or distance of a landmark or an intermediate object can be acquired by acquiring a transverse position of the landmark or the intermediate object with respect to the host vehicle on the basis of the information acquired from the stereo camera (the cameras 303 and 305) and measuring a distance thereto (a straight-line distance), it is possible to more accurately estimate a host vehicle position on a map.

Second Embodiment

Figure 10:
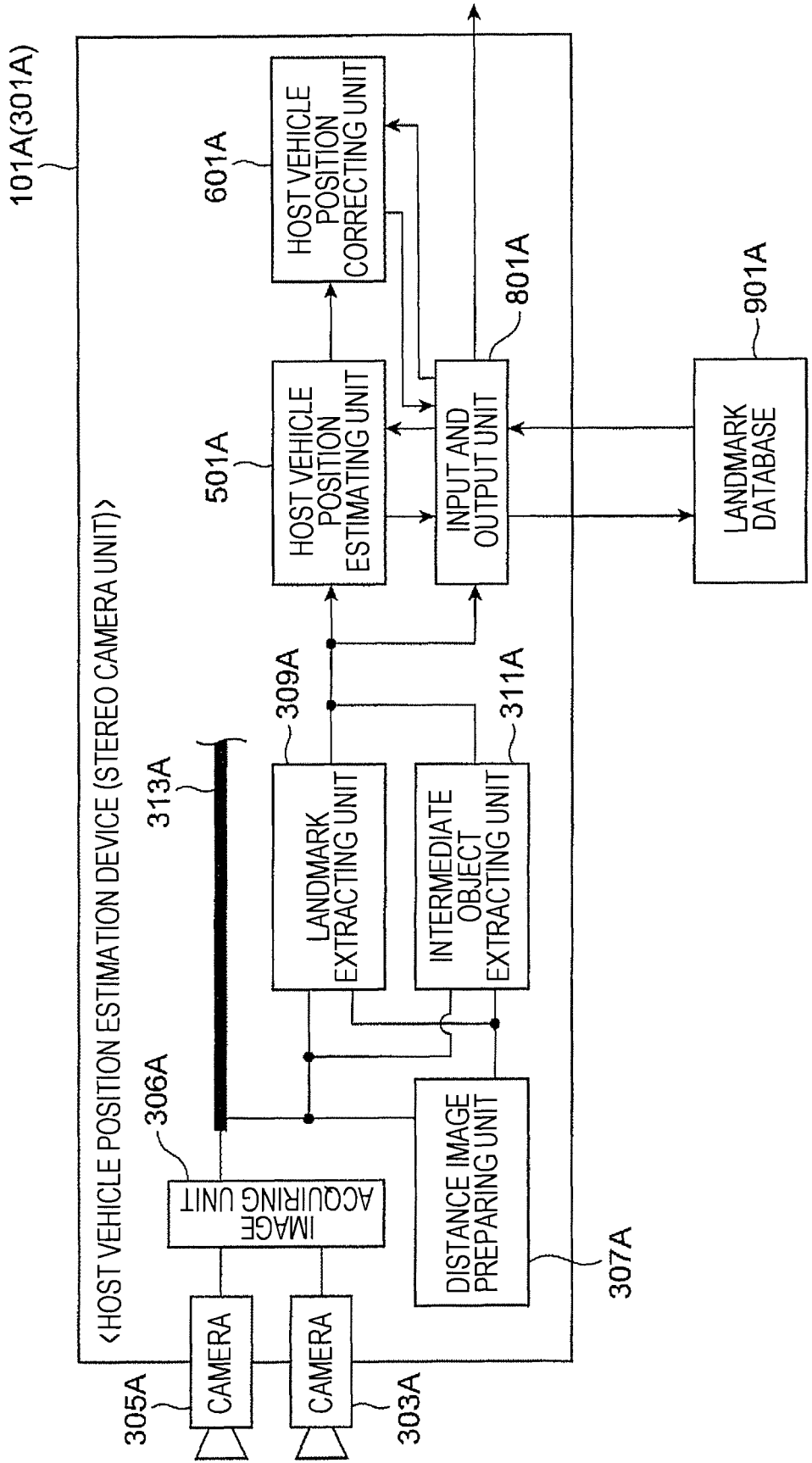
FIG. 10 is a block diagram illustrating an internal configuration of a second embodiment of a host vehicle position estimation device according to the invention.

FIG. 10 illustrates an internal configuration of a second embodiment of the host vehicle position estimation device according to the invention.

The functions of the units of a host vehicle position estimation device 101A according to the second embodiment are the same as the functions of the units of the host vehicle position estimation device 101 according to the first embodiment, except that an input and output unit 801A (a unit that exchanges data with a landmark database 901A) corresponding to a host vehicle position estimating unit 501A and a communication unit 701 is integrated in a stereo camera unit 301A in the second embodiment.

In this way, in the host vehicle position estimation device 101A according to the second embodiment, the entire device configuration can be simplified by integrating the functions in the stereo camera unit 301A.

In the first and second embodiments, a distance to an object appearing in an image is acquired using a plurality of images which are synchronously photographed using two cameras in order to secure estimation accuracy, but the distance to the object appearing in an image may be acquired using a plurality of images which are photographed using a single camera (a monocular camera) in a time series in order to simplify the device configuration. For example, a radar as a distance information acquiring unit may be mounted on the vehicle and a distance (a straight-line distance) to an object appearing in an image may be acquired on the basis of information acquired from the radar.

In the first and second embodiments, the communication unit 701 or the input and output unit 801A performs the process of comparing the information on a landmark transmitted from the landmark extracting unit 309 or 309A or the information on an intermediate object transmitted from the intermediate object extracting unit 311 or 311A with the information acquired from the landmark database 901 or 901A, but for example, the communication unit 701 or the input and output unit 801A may acquire arbitrary information from the landmark database 901 or 901A periodically or at an appropriate timing and transmit the acquired information to the host vehicle position estimating unit 501 or 501A and the host vehicle position estimating unit 501 or 501A may perform the process of comparing the information on a landmark transmitted from the landmark extracting unit 309 or 309A or the information on an intermediate object transmitted from the intermediate object extracting unit 311 or 311A with the information acquired from the landmark database 901 or 901A.

In the first and second embodiments, the cameras are disposed to face the front side of the vehicle and the host vehicle position on a map is estimated on the basis of image information of an imaging target area on the front side of the vehicle, but the host vehicle position on a map may be estimated on the basis of image information of an imaging target area on the rear side of the vehicle, for example, using cameras disposed to face the rear side of the vehicle.

The invention is not limited to the first and second embodiments, but can include various modifications. For example, the first and second embodiments are described above in detail for the purpose of easily understanding the invention, and the invention is not limited to including all the above-mentioned elements. Some elements of a certain embodiment may be replaced with some elements of the other embodiment, or some elements of a certain embodiment may be added to the elements of the other embodiment. Some elements of the embodiments may be subjected to addition of some elements, deletion, and substitution.

Control lines or information lines which are considered to be necessary for explanation are illustrated and all control lines or information lines in a product cannot be said to be illustrated. Actually, it may be considered that most of the elements may be connected to each other.

REFERENCE SIGNS LIST 101 host vehicle position estimation device
301 stereo camera unit
303, 305 camera
306 image acquiring unit
307 distance image preparing unit (distance information acquiring unit)
309 landmark extracting unit
311 intermediate object extracting unit
501 host vehicle position estimating unit
601 host vehicle position correcting unit
701 communication unit
901 landmark database

The invention claimed is:

1. A host vehicle position estimation device that estimates a position of a host vehicle using landmark information on names and positions of landmarks which is stored in advance, the host vehicle position estimation device comprising:
an image acquiring unit configured to acquire an image by photographing surroundings of the host vehicle;
a distance information acquiring unit configured to acquire distance information on a distance in a traveling direction of the host vehicle to an intermediate object appearing in the image or a straight-line distance to the intermediate object;
an intermediate object extracting unit configured to extract, from the image, intermediate information regarding the intermediate object, the intermediate information including a name of a landmark referenced by the intermediate object and a distance to the referenced landmark, and to acquire distance information on a distance to the intermediate object on the basis of the image and the distance information acquired by the distance information acquiring unit; and
a host vehicle position estimating unit configured to estimate the host vehicle position on the basis of (i) the intermediate information of the intermediate object, (ii) the distance information on the distance to the intermediate object extracted by the intermediate object extracting unit, and (iii) landmark information regarding the referenced landmark,
wherein the host vehicle position estimating unit is further configured to acquire a position of the referenced landmark, specify the position of the intermediate object based on the position of the referenced landmark, and estimate the host vehicle position using the specified position of the intermediate object and the distance information on the distance to the intermediate object which is acquired by the intermediate object extracting unit.

2. The host vehicle position estimation device according to claim 1, further comprising a communication unit configured to acquire the landmark information regarding the landmark referenced by the intermediate information of the intermediate object from a landmark database in which the landmark information is stored.

3. The host vehicle position estimation device according to claim 1, wherein the distance information on the distance to the intermediate object includes a distance in a transverse direction perpendicular to the traveling direction of the host vehicle to the intermediate object and the distance in the traveling direction of the host vehicle to the intermediate object or the distance in the transverse direction perpendicular to the traveling direction of the host vehicle to the intermediate object and a straight-line distance to the intermediate object.

4. The host vehicle position estimation device according to claim 1, wherein the distance information acquiring unit is configured to acquire the distance information using a plurality of images which are synchronously photographed using a plurality of cameras mounted on the host vehicle.

5. The host vehicle position estimation device according to claim 1, wherein the distance information acquiring unit is configured to acquire the distance information using a plurality of images which are photographed in a time series with a single camera mounted on the host vehicle.

6. The host vehicle position estimation device according to claim 1, wherein the distance information acquiring unit is configured to acquire the distance information using information acquired by a radar mounted on the host vehicle.

7. The host vehicle position estimation device according to claim 1, wherein the name of the landmark is written on the intermediate object.

8. The host vehicle position estimation device according to claim 1, further comprising a host vehicle position correcting unit configured to correct the host vehicle position on a map acquired by a global positioning system on the basis of the host vehicle position estimated by the host vehicle position estimating unit.

9. The host vehicle position estimation device according to claim 1, further comprising a landmark database or a communication unit configured to access the landmark database, wherein the image does not include any landmark referenced in the landmark database.

10. The host vehicle position estimation device according to claim 1, wherein the intermediate object is a sign that references the name of the landmark and the distance to the referenced landmark.

* * * * *